United States Patent [19]
Kawahara

[11] 3,819,267
[45] June 25, 1974

[54] DEVICE FOR MEASURING DIMENSIONS FROM THE FORWARD END PORTION OF AN ENDOSCOPE

[75] Inventor: Ichizo Kawahara, Tokyo, Japan

[73] Assignee: Olympus Co., Ltd., Tokyo, Japan

[22] Filed: Aug. 7, 1972

[21] Appl. No.: 278,452

Related U.S. Application Data

[60] Continuation-in-part of Ser. No. 114,241, Feb. 10, 1971, abandoned, which is a division of Ser. No. 749,809, Aug. 2, 1968, Pat. No. 3,595,220.

[30] Foreign Application Priority Data

| Aug. 8, 1967 | Japan | 42-50507 |
| Aug. 8, 1967 | Japan | 42-50508 |
| Aug. 8, 1967 | Japan | 42-50510 |
| Aug. 29, 1967 | Japan | 42-73425 |

[52] U.S. Cl. .......... 356/21, 356/3, 128/6
[51] Int. Cl. ...... G01c 3/24, A61b 1/06, G01b 11/02
[58] Field of Search ........ 356/3, 8, 17, 51; 350/301, 350/303, 304; 128/4, 5, 6, 7, 8, 9, 397; 356/21, 156, 171

[56] References Cited
UNITED STATES PATENTS

| 1,172,306 | 2/1916 | Pakrer & Hatch | 350/301 |
| 2,376,249 | 5/1945 | Hardt et al. | 128/8 |
| 2,403,308 | 7/1946 | Schwartz et al. | 356/17 |
| 2,995,059 | 8/1961 | Oehling | 356/17 |
| 3,007,365 | 10/1961 | Sho | 356/17 |
| 3,456,641 | 7/1969 | Yokata et al. | 356/51 |
| 3,534,729 | 10/1970 | Sakamoto | 128/6 |
| 3,561,432 | 2/1971 | Yamaki & Murata | 128/6 |
| 3,682,552 | 8/1972 | Hartman | 356/3 |
| 3,712,737 | 1/1973 | Bitterlich et al. | 356/8 |

*Primary Examiner*—Ronald L. Wibert
*Assistant Examiner*—Paul K. Godwin
*Attorney, Agent, or Firm*—Kurt Kelman

[57] ABSTRACT

The invention disclosed provides a device for measuring the dimension of the field of view of an endoscope, the forward end portion of which is adapted to be inserted into a hollow portion of a living body or the like for the inspection thereof. The endoscope is provided with a variable magnification objective lens system, a differential mechanism and a distance measuring means for determining the distance between the object and the forward end portion of the endoscope. The actual dimension of the field of view is determined by differentially coupling the differential mechanism with a magnification varying means and either a focus adjusting means for an objective lens system, or the distance measuring means such that the differential mechanism compensates for variation in magnification of the objective lens system and the distance between the object and the forward end portion thereby permitting the dimension of the field of view to be indicated by an indicating means operably coupled with the differential mechanism.

3 Claims, 22 Drawing Figures

DEVICE FOR MEASURING DIMENSIONS FROM THE FORWARD END PORTION OF AN ENDOSCOPE

This application for U.S. letters Pat. is a continuation-in-part of copending U.S. application Ser. No. 114,241, filed Feb. 10, 1971 now abandoned, which in turn is a divisional of U.S. application Ser. No. 749,809, filed Aug. 2, 1968, now U.S. Pat. No. 3,595,220, issued July 27, 1971.

The present invention relates to a device for measuring the actual dimension of the field of view obtained by an endoscope provided with a variable magnification objective lens system.

In using an endoscope, it is necessary to successively and intermittently observe an object such as a part of a hollow portion of a living body to be inspected in order to find out how the portion to be inspected changes as the time elapses by comparing the results of the inspection with those obtained in the previous inspections. In comparing the results of the inspection with those obtained by the previous inspections, it is necessary to accurately find out the distance between the object and the forward end portion of the endoscope in order to exactly determine the actual dimension of the field of view such that the correct judgement can be made on the development of the object which will vary in size as the time elapses.

Heretofore, the amount of the adjustment of focus of the objective lens system of the endoscope for sharply focusing the object was by assuming the distance between the object and the forward end portion of the endoscope. However, since a wide angle objective lens system having a relatively greater depth of focus is incorporated in the endoscope, the exact adjustment of the focus is very difficult thereby lowering the accuracy of the inspection.

In another prior art method, a light beam having a predetermined intensity is emitted from the forward end portion of the endoscope so as to illuminate the object, and the light reflected from the object is received by a sensing means provided in the forward end portion of the endoscope such that the intensity of the reflected light is converted into an electrical value from which the distance between the object and the forward end portion of the endoscope is estimated. However, the reliability of this method for determining the distance is relatively low because the angle formed between the optical axis of the objective lens system and the normal to the surface of the object tends to vary each time the inspection is effected by the endoscope, thereby resulting in variation in the light quantity received by the sensing means depending upon the change in the angle between the optical axis and the normal referred to above.

Where an endoscope is provided with a fixed focal length objective lens system, the size of the field of view obtained by the endoscope varies in proportion to the distance between the object and the forward end portion of the endoscope in which the objective lens system is located. Therefore, the actual dimension of the field of view can be determined unitarily by measuring the distance between the object and the forward end portion of the endoscope. On the other hand, when an endoscope is provided with a variable magnification objective lens system, the dimension of the field of view is varied not only by the change in the distance referred to above bu also by the change in the magnification power of the objective lens system.

Therefore, the actual field of view of the endoscope cannot be determined by merely measuring the distance between the object and the forward end portion of the endoscope. Compensation means must be introduced so as to compensate for the change in the magnification power of the objective lens system so that the correct measurement of the actual dimension of the field of view is achieved on the basis of the distance referred to above.

It has now been found that by practice of the present invention, a device is provided which effectively overcomes many problems encountered in endoscopes of the prior art.

Generally, the present invention provides a novel and useful device for measuring the actual dimension of the field of view obtained by an endoscope of the type having a variable magnification objective lens system regardless of the variation in the magnification power of the objective lens system and the variation in the distance between the object and the forward end portion of the endoscope.

In principle, the present invention utilizes one or two thin parallel light beams emitted from the forward end portion of the endoscope toward the object. The thus emitted thin parallel light beam or beams from bright light spot or spots on the surface of the object and the thus formed light spot or spots are viewed through the endoscope together with the image of the object. The position of the light spot with respect to the field of view obtained by the endoscope or the relative positions of the light spots with respect to the field of view varies as the distance between the object and the forward end portion of the endoscope varies.

The direction of the light beam from the present device may be controlled by operating a control mechanism provided relative a control housing of the endoscope. The control mechanism is connected to the forward end portion of the endoscope through an elongated tube which preferably is an elongated flexible tube, the flexure of which is controlled by means of a control means provided in the control housing. When the direction of the light beams from the endoscope is changed, the relative positions of the light spots formed on the surface of the object are varied. Thus, when the light beams are brought into a predetermined relation with espect to the field of view, or when the light spots are brought into registration with each other, the distance between the object and the forward end portion of the endoscope may be determined or fixed on the basis of the amount of operation of the control mechanism.

In accordance with a feature of the present invention, a differential mechanism is provided in the endoscope. The differential mechanism differentially couples either the adjusting means for the objective lens system or the distance measuring means with means for varying the variable magnification lens system and an indicating means for size determination. Operation of the differential mechanism is thus indicative of the distance between the object and the forward end portion of the endoscope. The effect of variation in the apparent size of the image of the object resulting from variation in the distance between the object and the forward end portion of the endoscope is compensated for by the differential mechanism and the magnification varying means thereby permitting the actual dimension of the object within the field of view to be indicated correctly by the indicating means regardless of any variation in the distance between the object and the forward end portion of the endoscope.

Other features of the present invention will be more apparent from the following description of the present invention taken with reference to the accompanying drawings.

IN THE DRAWINGS

FIG. 1 diagrammatically illustrates operation of an endoscope of the present invention when the actual size of an object is viewed by differentially coupling an indicator and a differential mechanism with an adjusting means for the objective lens system, and a magnification varying means;

FIG. 2 diagrammatically illustrates operation of an endoscope of the present invention when the actual size of an object is viewed by differentially coupling an indicator and a differential mechanism with a magnification varying means and a distance measuring means;

FIG. 3 exemplifies a side elevational view of an endoscope of the present invention;

FIG. 4 exemplifies a second side elevational view of the present endoscope;

Figure 16:
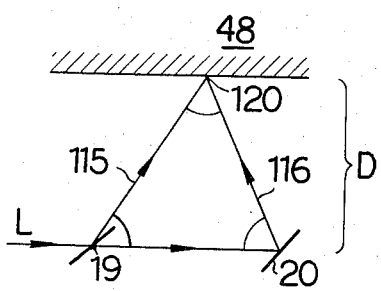
Figure 17:
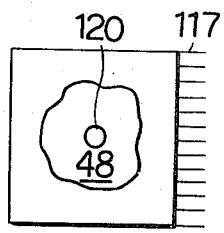
Figure 18:
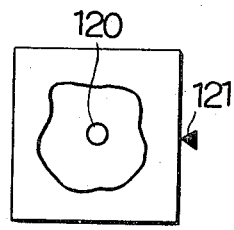
Figure 19:
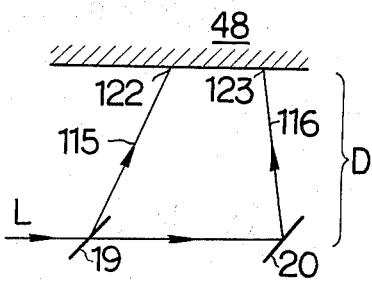
Figure 20:
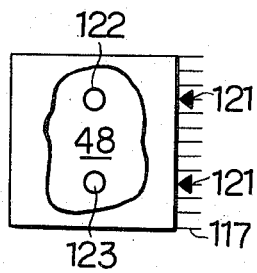
Figure 21:
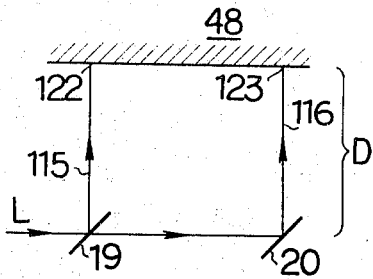
Figure 22:
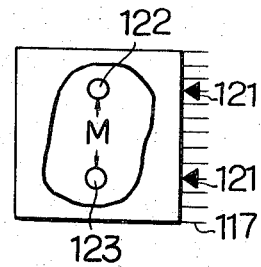

FIG. 16 diagrammatically illustrates how measurement may be effected when light beams form one spot on the object;

FIG. 17 illustrates how registration of beams of FIG. 16 may appear through an ocular means;

FIG. 18 illustrates a variation of FIG. 17 including a separate indicator;

FIG. 19 illustrates how measurement may be effected when light beams are non-parallel and form two light spots on the object;

FIG. 20 illustrates how registration of the light beams of FIG. 19 may appear through an ocular means;

FIG. 21 illustrates how measurement may be effected when light beams are parallel and form two light spots on the object; and FIG. 22 illustrates how registration of the light beams of FIG. 21 may appear through an ocular means.

Figure 1:
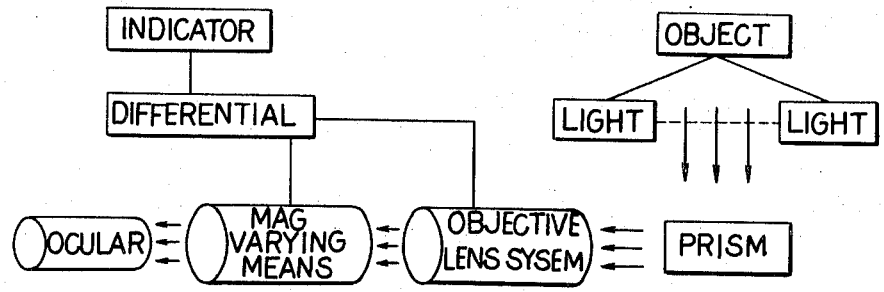

Referring to FIG. 1, operation of an endoscope of the present invention is diagrammatically illustrated when the actual size of an object is viewed using a differential mechansim for coupling a magnification varying means and an objective lens system adjusting means with an indicator. In FIG. 1, light beam directing elements forming the distance measuring means identified "light," direct light beams from the forward end of the endoscope for registration onto the object being viewed. Light from the object passes into a prism from which an image of the field of view is directed to the objective lens system and the magnification varying means for viewing by an individual using the ocular element.

Using the differential mechanism coupled to the objective lens system, and the magnification varying means permit reading of the actual size of the object being viewed by way of an indicator disposed for operation relative the differential mechanism. Thus, when the distance from the forward end of the endoscope changes, for example, a corresponding change is effected in the registration of the light beams on the object. The light beams sense the distance to the object. Variation in this distance is reflected by changing the objective lens system. This latter change is signaled to the differential mechanism which reflects a variation of distance value to the magnification varying means which corrects for any change thereby permitting direct viewing of the actual object size with reading thereof by means of the indicator.

Figure 2:
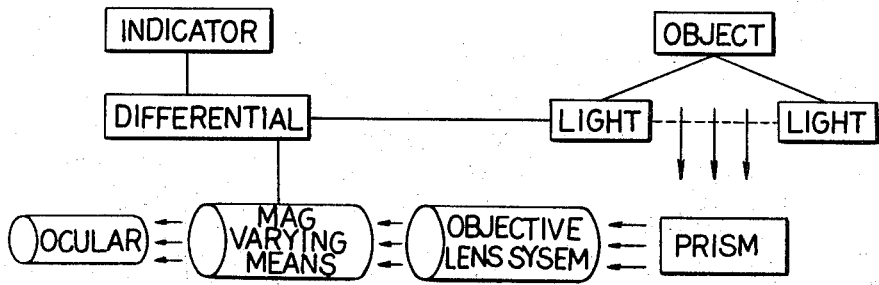

FIG. 2 illustrates operation of an endoscope of the present invention when the actual size of an object is viewed using a differential mechanism for coupling a distance measuring means and the magnification varying means with an indicator. Using the differential mechanism coupled to either one or both of the light beam directing elements, and the magnification varying means permits compensation of the actual size of the object being viewed by way of an indicator disposed for operation relative the differential mechanism. Thus, when the distance from the forward end of the endoscope changes, for example, a corresponding change is effected in the registration of the light beams on the object. The light beams sense the distance to the object and signal this value to the differential mechanism. The differential mechanism reflects a variation of distance value and the magnification varying means then corrects for any change thereby permitting viewing and reading of the actual object size by means of the indicator.

Figure 3:
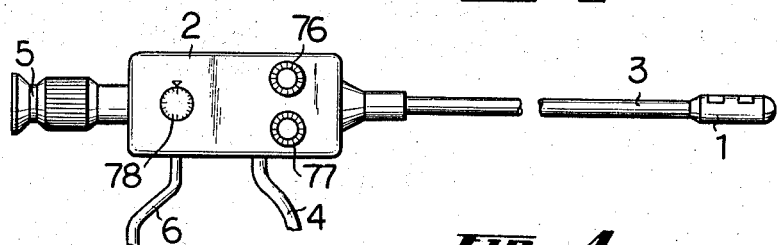
Figure 4:
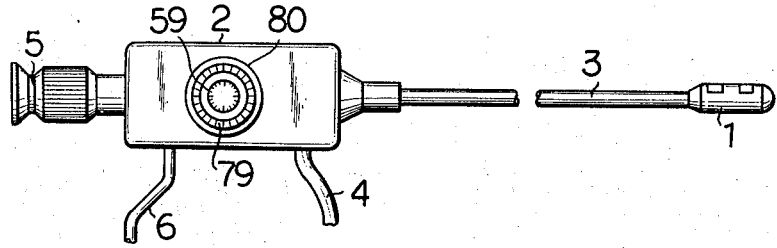

FIGS. 3 and 4 illustrate an endoscope device comprising a forward end portion 1 connected to a control housing 2 by means of elongated tube 3, which is preferably an elongated flexible tube. Control housing 2 is provided with a focus adjusting means, ocular means 5, and electric power supplying lead wires 6. Means may be included for effecting the bending of elongated tube 3 as desired.

Flexible tube 4, through which light may pass such as by means of optical fibers or the like, may be detachable secured to housing 2 and provides conduit means for passing light to end portion 1 by means of optical fibers. A light unit which may include a casing, light source, light reflector and light ray lens condenser may be included as desired to provide light having substantially parallel rays to tube 4.

Figure 10:
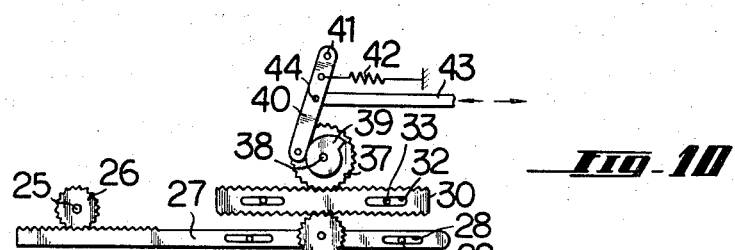
FIG. 10 illustrates a differential mechanism for use in the present device.
Figure 12:
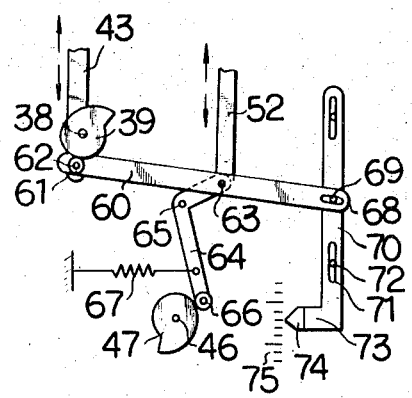
FIG. 12 illustrates yet another embodiment differential mechanism wherein connecting rods and cams are utilized.

FIGS. 3 and 4 illustrate an example of the appearance of the endoscope of the present invention for viewing the actual dimension of the field of view of the endoscope. FIG. 3 shows the endoscope with knob 76, for example, for operation to shaft 38 as shown in FIG. 10 or 12, while knob 77 provides an operating knob fixed to the shaft 46 shown in FIG. 10 or 12. The indicating means 78 is fixed to the shaft 25 shown in FIG. 10. The indicating means 78 may be replaced by the index pointer 74 and the graduations 75 as shown in FIG. 12.

Figure 11:
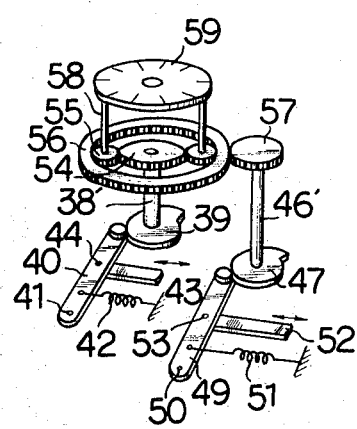
FIG. 11 illustrates an embodiment differential mechanism utilizing a planetary gear system.

FIG. 4 shows the endoscope in which the device illustrated in FIG. 11 is incorporated. In this case, the operating knobs 79 and 80 are disposed for effecting object lens adjustment or the distance measurement. These knobs are arranged concentrically together with the indicating means 59 by utilizing conventional gearing means for facilitating the operation of the device.

Figure 5:
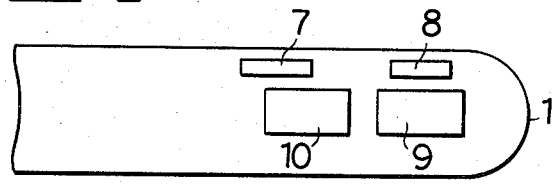
FIG. 5 is a partial view showing the top forward end portion of the endoscope of FIG. 3 as seen from the object being viewed.

FIG. 5 presents a partial top view of forward end portion 1 of the present endoscope. Light beams having parallel rays pass through windows 7 and 8 respectively, light from a suitable source from portion 1 passes through illumination window 9, and viewing may be effected using viewing window 10.

Figure 6:
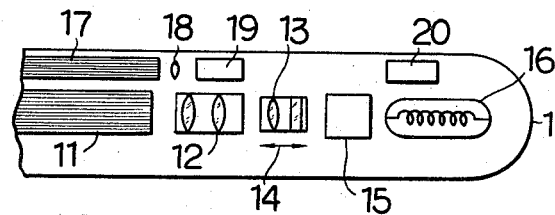
FIG. 6 is a fragmentary sectional view illustrating generally the internal portion of that forward end portion shown in FIG. 5.

FIG. 6 presents generally an example of arrangement of elements within the housing of the forward end portion 1 of the present endoscope.

As seen in FIG. 6, an image transmitting optical system 11, such as a fiber optical system by way of example, extends through elongated tube 3 from control housing 2, to the forward end portion 1 of the endoscope. A magnification lens system 12 is provided in the forward end portion 1 in front of the forward end of the image transmitting optical system 11 in the optical axis thereof with objective lens 13 similarly positioned with means for movement in direction of arrow 14. A light reflecting means 15 such as a prism is located in front of the objective lens. Thus, light from an object 48, FIG. 18, passing through viewing window 10 is reflected by light reflecting means 15 toward and through the objective lens systems 13 and the magnifications lens system 12, and to the housing 2 by way of optical system 11 when an image of the object may be viewed through ocular means 5. The image formed on the forward end of the image transmitting optical system 11 is transmitted therethrough to the rearward end thereof, i.e., the end part within housing 2. The rearward end of the image transmitting optical system 11 is located in the control housing 2 in front of the ocular means 5, thereby permitting the thus transmitted image of the object to be viewed through the ocular means. Adjustment of the focusing of the objective lens system 13 can be effected by means of the provided adjusting means.

A light source 16, such as a lamp or the like, is located in the forward end portion 1 and may be energized by an external power source through wires 6 extending from the control housing 2 through the elongated tube 3. Light source 16 illuminates the object through the window 9. The light source 16 may be replaced by a light conducting fiber optical system extending through the elongated tube 3 from the control housing 2 to the forward end portion 1. In this case, the rearward end of the light conducting fiber optical system adjacent to or in control housing 2 is illuminated by an external light source, i.e., simply light source 16 externally disposed, and the light transmitted through the light conducting fiber optical system to the forward end thereof is emitted therefrom toward the object by way of light illumination window 9.

In accordance with one of the features of the present invention, a light projecting means for emitting a pair of light beams is provided in order to measure the distance between object 48 and the forward end portion 1 of the endoscope. The light projecting means may include a single fiber optical system 17, a single collimating lens system 18, a semi-transparent light reflecting mirror 19, movable by a wire means, and a total light reflecting mirror 20 movable by second wire means. Mirrors 19 and 20 are located obliquely in the optical axis of the collimating lens system 18. Mirror 20 is remotely spaced at fixed distance from semi-transparent light reflecting mirror such that two light beams may be directed from mirrors 19 and 20 toward object 48. Alternatively, mirror 19 may be a total light reflecting mirror in which case a second fiber optical system similar to that of elements 17 and 18 provide light separately to mirror 20. Also, in this latter embodiment, mirrors 19 and 20 may be replaced individually with prism members as desired.

Fiber optical system 4 extends from the control housing 2 through the elongated tube 3 to the forward end portion 1. The rearward end of the fiber optical system 4 adjacent to or in the control housing 2 is illuminated by an external light source such that the light is transmitted through the fiber optical system 4 to the forward end 1 of the endoscope. The light emitted from at the forward end of the optical system is collimated by collimating lens system 18 to form a fine light beam having substantially parallel rays. The light beam may be reflected partly by the semi-transparent light reflecting mirror 19 toward the object 48 through a window 7 provided in the wall of the forward end portion 1. The remaining part of the light beam passing through semi-transparent light reflecting mirror 19 is reflected by total light reflecting mirror 20 toward the object 48 through a window 8 provided in the wall of the forward end portion 1.

Thus, light beams having substantially parallel rays project to the object 48 from the light reflecting means 19 and 20 to form two small light spots on the surface of the object 48. These light spots may then be viewed through the viewing optical system comprising, viewing window 10, light reflecting means 15, objective lens system 13, magnifications lens system 12, image transmitting optical system 11 and ocular means 5, together with the field of view of the object being observed.

In accordance with the present invention, a variable magnification lens system is provided for viewing the actual dimension of object 48 in the field of view available by an objective lens system varies in proportion to the distance between the object and the forward end portion of the endoscope.

Figure 7:
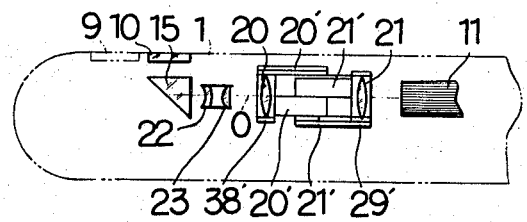
FIG. 7 is a longitudinal side sectional view schematically showing associated means in the forward part of the endoscope for viewing the actual size of an object.
Figure 8:
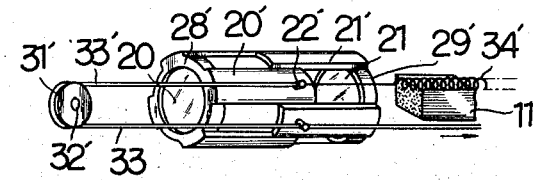
FIG. 8 is a perspective view showing two movable lens elements at positions spaced apart from each other by actuation of string means.
Figure 9:
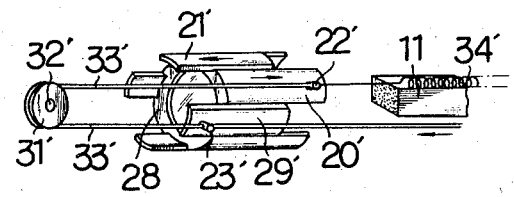
FIG. 9 is a perspective view similar to FIG. 8 but showing the two movable lens elements moved close to each other by releasing the string means.

FIGS. 7 to 9 show a means for varying the magnification lens system. Various additional means may be used for varying the magnification lens system such as those means for moving lens elements disclosed in U.S. Pat.

No. 3,561,432 by Shigeru Yamaki, the disclosure of which means is incorporated herein by reference.

The magnification lens system 12 includes at least two movable lens elements or lens groups each movable along the optical axis of the objective lens system and operatively coupled with each other so that movement will vary the distance between the two movable lens elements so as to permit magnification. The movement of the lens elements may be controlled by string means extending through the longated tube 3. The string means can be actuated by operating a control mechanism so that the movable lens elements are moved so as to vary the magnification of the lens system. Thus, using the endoscope constructed in accordance with the present invention, the size of the field of view can be varied by operating the control mechanism coupling the magnification lens.

The objective lens 13 may be disposed in a cylinder element positioned for movement in the optical axis. Similar string means such as illustrated for varying magnification may be disposed for moving lens system 13 in the direction of arrow 14 by movement of a control on housing 2. Thus, the objective lens 13 may be varied, and when coupled as indicated in FIG. 1, provides focal compensating means relative to the magnification varying lens elements by way of the differential mechanism.

In FIGS. 7-9, magnification lens system 12 includes a pair of movable lens elements 20 and 21 for varying the magnification, and objective lens system 13 includes a movable pair of lens elements 22 and 23 for adjusting the focal point of the system. Prism 15 is located in front of the objective lens system so that the light from object 48 is received by prism 15 through viewing window 10 in the front end 1. Light with the field of view from prism 15 is reflected toward the movable objective lens system, the lens elements 22 and 23 of which may be moved by a control device provided in the control housing 2 so as to adjust the focal point of the objective lens system using, for example, similar string means illustrated in FIGS. 8 and 9 for moving the magnification lens elements. It will be recognized that convenient means such as guide slots or the like are included within casing 1 to permit operational movement of the objective lens and the magnification lens as described. Further disclosure of useful means for operational movement of these lens elements is provided in aforesaid U.S. Pat. No. 3,561,432.

Referring to FIGS. 7-9, lens elements 22 and 23 are mounted fixedly in a lens barrel movable disposed for permitting the focal length of the objective lens system to be varied. Lens holders 28' and 29' are illustrated holding magnification lens elements 20 and 21 respectively. These elements may be positioned slidably mounted within a housing barrel as desired. Lens holder 28' is provided with a plurality of arms 20' extending therefrom rearwardly along optical axis 0 in spaced relation from each other with the clearances each having the same width measured normal to the optical axis O being formed between the adjacent two arms 20'. In the similar manner, the lens holder 29' is provided with the same number of arms 21' as the arms 20' extending forwardly therefrom along the optical axis O in spaced relation from each other. The width of each of the arms 21' is so determined that the arms are snugly and slidably engaged in the respective clearances formed between the adjacent two arms 20' of the lens holder 28'. Thus, the two movable lens elements 20, 21 are smoothly shifted relatively to each other along the optical axis 0 in the cylindrical lens barrel when they are moved by the operation of a control mechanism as described herein.

String 33' extending from the control mechanism provided in the control casing 2 through the elongated tube 3 extends beyond the two movable lens elements 20, 21 to the pulley 31' and is led back rearwardly therearound. The extremity of the string 33' thus led back rearwardly is attached to pin 22' fixedly secured to one of the arms 20' of the lens holder 28' as shown in FIG. 8. One end of the spring 34' is attached to the pin 22' so as to resiliently keep the string 33' in the tensioned state. A pin 23' fixedly secured to one of the arms 21' of the lens holder 29' is attached to the portion of the string 33' extending from the control mechanism to the pulley 31'. Therefore, it is apparent that the two movable lens elements 20, 21 are moved from each other by pulling the string 33' against the action of the spring 34' by the operation of the control mechanism so that the lens system can be continuously varied.

FIG. 9 shows the embodiment of FIG. 8 under the condition in which the two movable lens elements 20, 21 are moved toward each other by releasing the string 33'.

It is apparent that the extremity of the string 33' led back rearwardly around the pulley 31' and the spring 34' can be attached to the pin 23' instead of the pin 22' and the pin 22' can be attached to the portion of the string 33' extending between the pulley 31' and the control mechanism so that the two movable lens elements 20, 21 are moved toward each other by pulling the string 33' by the operation of the control mechanism.

It is apparent that, if the string 33' is of sufficient stiffness so that the two movable lens elements 20, 21 can be moved in either of the directions by pulling or pushing the string 33' by the actuation of the control mechanism, the spring means 34' can be omitted.

The differential mechanism comprises a pair of movable members and a third movable member differentially coupled with each of the pair of movable members so that the third movable member is moved by the resultant amount differentially given from the pair of movable members. Thus, either the string means for having the magnification lens system may be operably connected to one of the pair of movable members and the other of the pair of movable members may be operably connected to the means for adjusting the objective lens system or the distance measuring means. The third movable member may be coupled with the indicating means for directly indicating the size of the object in cooperation with graduations or the like. For example, the indicating means may include numerals indicating the percentage of actual size of the object being viewed.

Thus, by way of the differential mechanism, the indicating means can always indicate the actual dimension of the object or the proportion thereof being viewed regardless of the variation in the distance of the object from the forward end portion of the endoscope. The differential mechanism compensates for any variation in the apparent size of the image of the object in the viewing optical system of the endoscope because of variation in distance from the forward portion of the endoscope and the object being viewed.

FIG. 10 shows one form of the differential mechanism of the present invention. Indicating means are fixed to a shaft 25 to which a pinion 26 is secured. The pinion 26 meshes with the rack formed in a shiftable bar 27. The shiftable bar 27 is guided for the limited movement longitudinally thereof by means of elongated holes 28 formed therein engaging with guide pins 29 secured to stationary members in the control housing. Thus, the indicating means is rotated in accordance with the movement of the shiftable bar 27. A pair of racks 30 and 31 are shiftably mounted in parallel to the shiftable bar 27 at opposite sides thereof. Elongated holes 32 and 34 formed in the racks 30 and 31, respectively, slidably engage with guide pins 33 and 35, respectively, for the limited movement of each of the racks 30 and 31 longitudinally thereof in parallel to the shiftable bar 27. A pinion 36 is notably mounted on the shiftable bar 27. The pinion 36 meshes with each of the teeth of the racks 30 and 31. Pinion 37 is secured to shaft 38 rotatably supported in the control housing. The pinion 37 meshes with other teeth of the rack 30. The shaft 38 has mounted thereon cam 39 such as that having the contour in the form of the spiral of Archimedes. A swingable lever 40 pivoted at 41 is urged by means of spring 42 so as to contact with the contour of the cam 39. A rod 43 is pivotably connected to the lever 40 at 44, so that when a knob secured to the shaft 38 is rotated, the rack 30 is shifted by the engagement of the cam 39 with the lever 40. A shaft 46, cam 47, pinion 48, lever 49 and a rod 52 are arranged in the same manner as described above. Therefore, when a knob secured to the shaft 46 is rotated, the rack 31 is shifted through the engagement thereof with the pinion 48 while the rod 52 is shifted by the engagement of the cam 47 with the lever 49. It is apparent that the shiftable rod 27 is moved by the resultant amount differentially given from the rack 39 and the rack 31 by virtue of the engagement of the pinion 36 with both the racks 30 and 31. Therefore, the indicating means mounted on shaft 25 is rotated by the amount corresponding to the shifting movement of the shiftable rod 27. In accordance with the present invention, rod 43 may be operatively coupled with either the adjusting means for the objective lens system or the distance measuring means for determining the distance of the object from the forward end portion of the endoscope as indicated in FIGS. 1 and 2 while the rod 52 is operatively coupled with the magnification lens by way of string 33'. Thus, when the endoscope is operated such that the adjusting of the optical lens system or the measurement of the distance is varied, a corresponding variance appears in the magnification lens with the result being that the indicating means is rotated by the amount corresponding to the resultant movement of the shiftable rod 27 differentially derived from the respective rods 43 and 52 thereby permitting the actual size of the object in the field of view to be read by means of the indicating means which may cooperate with a stationary index if desired.

Thus, by manually rotating knob 76 in FIG. 1, for example, in the clockwise direction, shaft 38 secured to knob 76 is rotated in the clockwise direction together with cam 39 and pinion 37 each secured to shaft 38. Lever 40 contacting with cam 39 is swung in the anticlockwise direction so that lever 43 pivoted at its one end to lever 40 is moved to the right. Lever 43 is connected by a string extending through the flexible tube to the focus adjusting means for moving lens elements 13 thereby permitting the focus adjustment of the objective to be effected by operating knob 76. The amount of the focus adjustment is indicative of the distance between the objective and the object. Rack 30 engaging with pinion 37 is moved to the left by the clockwise rotation of pinion 37. Therefore, pinion 36 rotatably mounted on lever 27 is rotated in the anticlockwise direction and, at the same time, lever 27 is moved to the left by an amount relating to the amount of the focus adjustment, assuming that rack 31 is held stationary.

On the other hand, when cam 47, pinion 48 secured to knob 77 through shaft 46 are rotated in the anticlockwise direction by the manual rotation of knob 77 in the anticlockwise direction, lever 49 contacting with cam 47 is rotated in the clockwise direction so that lever 52 pivoted at its one end to lever 49 is moved to the right. Lever 52 is connected by a string extending through the flexible tube to the magnification varying means for moving lens elements 12 thereby permitting the magnification to be varied by rotating knob 77. Rack 31 engaging with pinion 48 so that pinion 36 is rotated in the clockwise direction and, at the same time, lever 27 is moved to the left by an amount relating to the amount of variation in magnification, assuming that rack 30 is kept stationary. Thus, lever 27 is differentially moved by the resultant movement of rack 30 indicative of the amount of focus adjustment and the rack 31 indicative of the amount of variation in magnification. Indicating means 78 for the actual dimension of the field of view is secured to pinion 26 through shaft 25 and pinion 26 is engaged with the rack formed on lever 27, thus permitting the resultant movement of lever 27, i.e., the actual dimension of the field of view, to be indicated by indicator 78 in which the variation in the distance between the objective and the object and the variation in the magnification are properly compensated for by the differential mechanism.

FIG. 11 shows an alternative form of the differential mechanism useful in the present device and based on a planetary gear system. In FIG. 11, the rod 43 is pivotably connected to the lever 40 at 44, and is operatively coupled with the adjusting means for the optical lens or the distance measuring means, such as indicated previously. The lever 40 is pivoted at its one end at 45 while the other end is urged to contact with the cam 39 by means of the spring 42 in the same manner as shown in FIG. 10. Similarly, rod 52 is operatively coupled with the magnification means. The swingable lever 49 pivotably mounted on rod 52 is urged to contact with the cam 47 by means of the spring 52. The shaft 38' having mounted thereon cam 39 is provided with gear 54 at the other end thereof. A plurality of planetary pinions 55 are engaged with gear 54. The planetary gears 55 also engage with the internal gear teeth of a rotatable ring gear 56. The outer gear teeth of the rotatable ring gear 56 engages with a gear 57 secured to a shaft 46' which is in turn secured to the cam 47. The gears 55 are rotatably supported by shafts 58 which are secured to indicating disc 59, having thereof graduations for indicating relative size dimension. Thus, when shaft 38' is rotated, rod 43 is moved by the engagement of the cam 39 with the rod 40 so as to actuate either the adjusting means for the optical lens or the distance measuring means while gear 54 is rotated so that the planetary gears 55 are moved around gear 54 when the ring gear 56 is kept stationary. Therefore, indicating disc 59 is rotated by the angle corresponding to the movement of the rod 43 such that the amount of the rotation of the disc 59 reflects the distance between the object and the forward end portion of the endoscope correlated with either the adjusting means for the optical lens or the distance measuring means. On the other hand, shaft 46' is rotated such that the magnification means is varied by moving rod 52 through the engagement of the cam 47 with lever 49. Gear 57 secured to the shaft 46' rotates the ring gear 56 thereby permitting the planetary pinions 55 to be moved around the gear 54 so as to rotate the indicating disc 59 for compensating for any variation. Thus, the indicating disc 59 always indicates a value of the actual dimension of the object in the field of view in cooperation with a stationary index provided adjacent to the periphery of the disc 59 despite the fact that the position of the end of the endoscope is varied relative the object being varied.

FIG. 12 shows another form of the differential mechanism of the present invention in which connecting rods and cams are utilized without employing gear means. In FIG. 12, the rod 43 operatively coupled with either the adjusting means for the objective lens system or the distance measuring means, is pivotally connected to one end of a lever 60 at 61. A roller 62 is rotatably mounted on the lever 60 or adjacent to the pivotal connection between the rod 43 and lever 60 so as to cooperate with the cam 39. Rod 52 operatively coupled with the magnification means is pivotally connected to the lever 60 at the midpoint thereof by a pin 63 fixed to the lever 60. The pin 63 also pivotally supports one end of a bell crank lever 64 pivoted at 65. The other end of the bell crank lever 64 rotatably supports a roller 66 which contacts with the cam 47 fixed to the shaft 46. Spring 67 is connected to lever 64 so as to positively urge the roller 66 against the cam 46. The outer end of the lever 60 is provided with an elongated hole 68 in which pin 69 secured to lever 70 is slidably fitted. The lever 70 is provided with elongated holes 71 in which pins 72 fixed to stationary points in the control housing are slidably fitted so as to guide lever 70 for limited movement thereof longitudinally of the lever 70. The outer end of lever 70 is provided with arm 73 having an index pointer 74 with which graduations 75 provided on a stationary member of the control housing cooperate so as to indicate a relative value of the actual dimension of the object being measured in the field of view.

In operation, when a knob secured to the shaft 38 is rotated so as to actuate the rod 43 coupled with either the adjusting means for the optical lens system or the distance measuring means, cam 39 swings lever 60 about the pin 63 so that lever 70 is shifted by an amount corresponding to the variation of the adjusting means or the distance measuring means by virtue of engagement of pin 60 of the lever 70 with the elongated hole 68. By this means, index pointer 74 is permitted to be moved along the graduations 75 to indicate a relative value of the actual dimension of the object being measured in the field of view which varies as the distance of the object from the forward end portion of the endoscope varies. On the other hand, when shaft 46 is rotated so as to swing the bell crank lever 64 about the pivoted point 65 by the engagement of the cam 47 with the roller 66 so that rod 52 is moved to adjust the magnification means, the pin 63 also moves the lever 60 about the pivotal connection indicated at 61 so as to compensate for the movement of the lever 70. Thus, the index pointer 74 always indicates a relative value for the actual dimension of the object being viewed in the field of view despite the fact that the distance of the end of the endoscope from the object varies.

Figure 13:
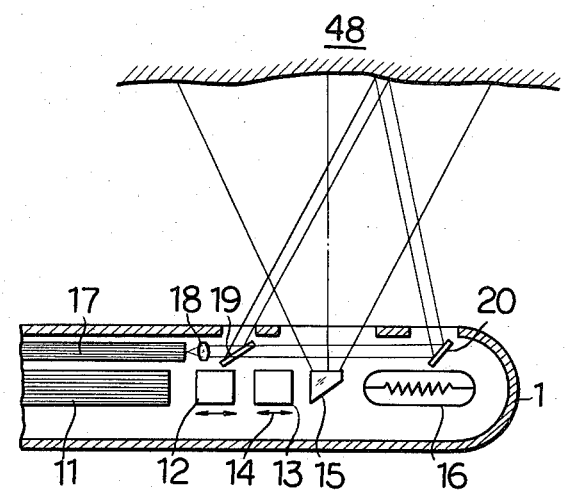
FIG. 13 illustrates how measurement of distances may be effected when light beams are brought into registration on the object.

In a variation of the present invention illustrated in FIG. 13, the direction of eithe one or of each of the two light beams is fixed so that they are directed at known fixed angle to the object 48 within the field of view available by the objective lens system 13. FIG. 13 also presents an illustration of how measurement may be effected using the device of the present invention.

Figure 14:
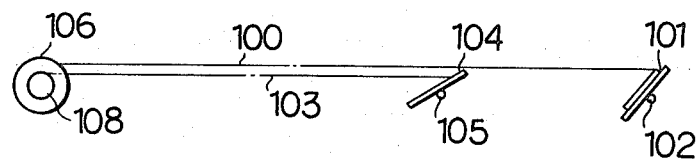
FIG. 14 illustrates means for changing direction of light beams for measuring distances.

In one form of the present invention illustrated in FIG. 14, the direction of either one or both of one or two light beams may be varied. Wire means 100, for example, may be included to vary the angle of mirror 101 when disposed on supporting pivotal axis 102, and/or wire means 103 may be included to similarly vary the angle of mirror 104 when supported on pivotal axis 105. Wire means 100 may be moved for mirror varying purposes by control knob 106 which may be disposed relative housing 2, and wire means 103 may be moved for mirror varying purposes by control knob 108 similarly disposed as desired. Either one or both of control knobs 106 and 108 may be referenced to indicating marks by coupling to the differential mechanism for noting the distance to the object being measured. It is recognized that either one or two light projecting mirrors may be employed as well as that prism members may be used in place of the mirror members as desired.

Figure 15:
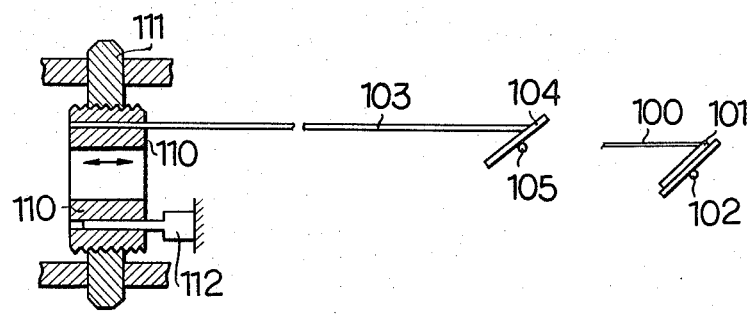
FIG. 15 illustrates an embodiment means for changing direction of light beams for measuring distances.

FIG. 15 shows an embodiment means for changing the direction of either one or both of the light beams. Either wire 100 or wire 103, or both if desired, may be attached to an axially movable member 110, movable by rotation of wheel 111 through provided teeth elements. Wheel 111 may be positioned near the barrel of ocular elemt 5 of the housing 2, of FIGS. 3 or 4. Axial movement of member 110 is assured by slide pin 112 secured to the housing with axial movement permitted within element 110 as illustrated in FIG. 15.

FIG. 16 diagrammatically presents elements of FIG. 13 exclusive of detail. Light beam L from collimating lens system 18 partially reflects as beam 115 from mirror 19, and the remainder reflects as beem 116 from mirror 20. The light beams 115 and 116 may be positioned to cross each other at an angle $\beta$ at a certain distance from the forward end portion 1 and measurement D may thus be effected. Also, the angle $\beta$ may be made zero, i.e., the two light beams may be made parallel to each other in which case measurement is effected such as described subsequently.

The positions of the two light spots relative to each other with respect to the field of view of the endoscope as seen in the focal plane of the ocular means 5 vary as the distance D of the object 48 and the forward end portion 1 varies when the angle $\beta$ is set to a fixed value. Therefore, the distance D between object 48 and the forward end portion 1 can be determined on the basis of the relative positions of the two light spots with respect to the field of view as seen in the focal plane of the ocular means 5, noting FIG. 17.

Graduations 117 are provided in the focal plane of the ocular means 5 as shown in FIG. 17, along with object 48. The location of the graduations 117 is so determined that it extends in the direction corresponding to the location of the plane including the optical axis extending from the light-reflecting mirrors to the object 48.

When the distance between the object 48 and the forward end portion 1 of the endoscope is varied, for example, then the position of the light spot or spots formed by the light beam or beams on the surface of the object 48 as viewed through the ocular means also varies with respect to the field of view available, thereby permitting the position of the light spot 120 to be read out by means of the graduations 117. Thus, the distance between object 48 and the forward end portion 1 can be determined by the medium of the graduations 117 provided in the focal plane of the ocular means to serve as a light spot reference point for fixing distance D.

Alternatively, a movable index mark 121 of FIG. 18 may be provided in place of the graduations 117 so that the index mark 121 or the image thereof formed by a conventional optical system is moved in the focal plane of the ocular means 5 by means of a control knob provided on the control housing 2. The movement of the index mark 121 may be controlled by the control knob so that the index mark 121 is brought nto registration with the light spot as viewed in the focal plane of the ocular means 5. Thus, the distance of the object 48 from the forward end portion 1 is determined on the basis of the amount of the operation of the control knob by means of the differential mechanism for bringing the index mark 121 into registration with the light spot. To this end, an indicating means amy be provided in the control housing as indicated previously which indicates the amount of movement of the control knob by way of the differential mechanism in terms of the distance of the object 48 from the forward end portion 1 of the endoscope.

Further illustrations of how present distances may be determined using the present device are disclosed in parent application, now U.S. Pat. No. 3,595,220, the disclosure of which is incorporated herein by reference.

Thus, with reference to FIGS. 16-18, measurement of distance D may be effected as follows. Mirrors 19 and 20 are fixed in known spaced position thereby fixing angles $\alpha$ and $\gamma$ respectively. When the beams of light 115 and 116 cross at the object 48, and when the resulting spot 120 appears at a pre-determined reference location using reference lines 117 by way of example, within the field of view, then the value D becomes known. This determination is thus based on simple mathematics.

FIGS. 19 and 20 present the situation, for example, when the reflecting angle of either one or both of mirrors 19 and 20 vary. The procedure is essentially the same as that indicated previously except two spots 122 and 123 are involved. Since the mirror angles are predetermined by using means illustrated in FIGS. 14 or 15, angles $\alpha$ and $\gamma$ of beams 115 and 116 also become known. Simply, measurement may be effected using spots 122 and 123 when registered into a reference location such as FIG. 20.

Referring to FIGS. 21 and 22, when angle $\beta$ is set to zero, the coincidence of the two light spots 122 and 123 do not occur. However, the apparent distance between the two light spots as viewed in the focal plane of the ocular means 5 varies as the distance of the object 48 from the forward end portion 1 varies. This variation results because although the beams are formed of substantially parallel rays, they may diverge with distance resulting in spots of greater diameters on the object. Therefore, the distance D of the object 48 from the forward end portion 1 can be determined on the basis of the distance M between the two light spots 122 and 123 with respect to the field of view of the endoscope, noting FIG. 22.

Thus, in accordance with a feature of the present invention, either one or both of the light reflecting mirrors 19 and 20 or similar means may be rotated by the operation of a control mechanism through a differential mechanism provided on control housing 2. Either one or both of the light reflecting mirrors 19 and 20 may be rendered movable such that either one or both of the light spots formed on the surface of the object 48 may be moved to bring the two light spots into registration with each other, i.e., the FIG. 16 illustration, or into a predetermined relation with respect to the field of view, i.e., the FIG. 19 illustration. The amount of the operation of the control mechanism for bringing the two light spots into registration with each other or into a predetermined relation with respect to the field of view varies according to the distance D between the object 48 and the forward end portion 1. Therefore, the distance D of the object 48 from the forward end portion 1 can be either directly determined or suitable means are included by way of a differential mechanism for providing read out of the distance D on the control housing.

It will also be recognized that one light beam may be used when employing relative markings 117 and 121 as indicated previously for determining distance to the object from the forward end of the endoscope.

It will be apparent from the foregoing that the present device provides great versatility, great efficiency and simplicity of construction affording wide use. The construction of the present device is extremely simple and can be made compact so that it is easily incorporated into the forward end casing 1 of an endoscope having limited diameter such as 12 mm., or less.

The various elements of the present device may be secured to adjoining elements by any suitable means.

Although a preferred embodiment of the present invention has been illustrated herein, it is to be understood that various changes and modifications may be made in the construction and arrangelent of elements without departing from the spirit and scope of the invention as defined.

What is claimed is:

1. In a device for measuring the actual dimension of an object in the field of view available by an endoscope having a forward end portion adapted to be inserted into a hollow portion of a living body or the like for the inspection thereof, a control housing and an elongated tube connecting said forward end portion to said control housing, a variable magnification lens system in said forward end portion, an image transmitting optical system such as a fiber optical system extending from said forward end portion through said elongated tube to said control housing thereby permitting an image of the object focused on the forward end of said image transmitting optical system by said variable magnification lens system to be transmitted therethrough to the rearward end thereof so as to be viewed through an ocular means provided in said control housing, said device further comprising magnification varying means for said magnification lens system, and focus adjusting means for an objective lens system, the amount of movement of each of said magnification varying means and focus adjusting means being indicative of the adjustment given to each of said means, wherein the improvement comprises a differential mechanism differentially coupling said magnification varying means with said focus adjusting means so as to detect the amount of the resultant movement of said differential mechanism and indicating means operatively coupled with said differential mechanism so as to be actuated thereby in accordance with said detected resultant movement thereby permitting a relative indication of the actual size of the object in the field of view to be directly indicated by means of said indicating means despite the fact that the field of view as viewed through said ocular means varies with the magnification of said objective lens system, and the distance between the object and said forward end portion.

2. In a device for measuring the actual dimension of an object in the field of view available by an endoscope having a forward end portion adapted to be inserted into a hollow portion of a living body or the like for the inspection thereof, a control housing and an elongated tube connecting said forward end portion to said control housing, a variable magnification lens system in said forward end portion, an objective lens system disposed forward of said variable magnification lens system, an image transmitting optical system such as a fiber optical system extending from said forward end portion through said elongated tube to said control housing thereby permitting an image of the object focused on the forward end of said image transmitting optical system by said variable magnification from said objective lens system to be transmitted therethrough to the rearward end thereof so as to be viewed through an ocular means provided in said control housing, said device further comprising magnification varying means for said magnification lens system, and distance measuring means for detecting the distance of the object from said forward end portion, the amount of movement of said magnification varying means and said distance measuring means being indicative of the adjustment given to each of said means, wherein the improvement comprises a differential mechanism differentially coupling said magnification varying means with said distance measuring means so as to detect the amount of the resultant movement of said differential mechanism and indicating means operatively coupled with said differential mechanism so as to be actuated thereby in accordance with said detected resultant movement thereby permitting the relative indication of the actual size of the object in the field of view to be directly indicated by means of said indicating means despite the fact that the field of view as viewed through said ocular means varies with the magnification of said objective lens system, and the distance between the object and said forward end portion.

3. The device of claim 2 wherein the distance measuring means comprises at least one light beam having substantially parallel rays of light emitted from the forward end of the endoscope within the field of view.

* * * * *